(12) United States Patent
Byrne et al.

(10) Patent No.: US 7,743,427 B2
(45) Date of Patent: *Jun. 22, 2010

(54) SYSTEM FOR DYNAMICALLY ENCRYPTING INFORMATION FOR SECURE INTERNET COMMERCE AND PROVIDING EMBEDDED FULFILLMENT SOFTWARE

(75) Inventors: Shannon Lee Byrne, Whistler (CA); Innes Muecke, Halifax (CA); Andrew Patterson, Dartmouth (CA); David Slik, Brackendale (CA)

(73) Assignee: Arvato Digital Services Canada, Inc., Kitchener, Ontario (CA)

( * ) Notice: Subject to any disclaimer, the term of this patent is extended or adjusted under 35 U.S.C. 154(b) by 1042 days.

This patent is subject to a terminal disclaimer.

(21) Appl. No.: 11/453,144

(22) Filed: Jun. 15, 2006

(65) Prior Publication Data

US 2006/0242714 A1  Oct. 26, 2006

Related U.S. Application Data (63) Continuation of application No. 11/035,046, filed on Jan. 14, 2005, now Pat. No. 7,124,437, which is a continuation of application No. 10/126,974, filed on Apr. 22, 2002, now Pat. No. 7,010,697, which is a continuation of application No. 09/031,536, filed on Feb. 27, 1998, now abandoned, which is a continuation-in-part of application No. 08/670,846, filed on Jun. 28, 1996, now Pat. No. 5,809,145.

(51) Int. Cl.
*G06F 17/30* (2006.01)

(52) U.S. Cl. ............................ 726/30; 726/28; 713/153; 713/163; 705/56

(58) Field of Classification Search ................... 726/28, 726/30; 713/153, 163; 705/51, 52, 56
See application file for complete search history.

(56) References Cited

U.S. PATENT DOCUMENTS

| 4,713,753 A | 12/1987 | Boebert et al. ............... 364/200 |
| 4,736,423 A | 4/1988 | Matyas ......................... 380/23 |
| 4,888,798 A | 12/1989 | Earnest .......................... 380/4 |
| 4,897,874 A | 1/1990 | Lidinsky et al. ............... 380/25 |
| 4,924,378 A | 5/1990 | Hershey et al. ................ 726/29 |
| 4,926,476 A | 5/1990 | Covey ............................ 380/4 |
| 5,010,571 A | 4/1991 | Katznelson .................... 380/4 |
| 5,058,162 A | 10/1991 | Santon ......................... 380/25 |

(Continued)

FOREIGN PATENT DOCUMENTS

| WO | 9320508 | 10/1993 |
| WO | 9721162 | 6/1997 |

*Primary Examiner*—Emmanuel L Moise
*Assistant Examiner*—Paul Callahan
(74) *Attorney, Agent, or Firm*—Roylance, Abrams, Berdo & Goodman, L.L.P.

(57) ABSTRACT

A data distribution system is provided which supplies customers with an executable for requested secured data files to provide the customer with fulfillment software, obviating the need for the customer to download fulfillment software prior to requesting secure data. The data distribution system is characterized by server technology which can dynamically encrypt secured data files just prior to a customer request to download the data file. A framework for building a universal data distribution infrastructure is provided which employs Requesters.

12 Claims, 6 Drawing Sheets

U.S. PATENT DOCUMENTS

| | | |
|---|---|---|
| 5,218,638 A | 6/1993 | Matsumoto et al. ............ 380/23 |
| 5,222,134 A | 6/1993 | Waite et al. .................... 705/59 |
| 5,247,575 A | 9/1993 | Sprague ......................... 380/9 |
| 5,297,206 A | 3/1994 | Orton ............................ 380/30 |
| 5,319,705 A | 6/1994 | Halter et al. .................... 380/4 |
| 5,337,357 A | 8/1994 | Chou et al. ..................... 380/4 |
| 5,341,429 A | 8/1994 | Stringer et al. ................. 705/52 |
| 5,369,702 A | 11/1994 | Shanton ......................... 380/4 |
| 5,386,369 A | 1/1995 | Christiano .................... 364/464 |
| 5,400,403 A | 3/1995 | Fahn et al. .................... 380/21 |
| 5,410,598 A | 4/1995 | Shear ............................ 380/4 |
| 5,414,772 A | 5/1995 | Naccache et al. ............. 380/46 |
| 5,457,746 A | 10/1995 | Dolphin ......................... 380/4 |
| 5,499,295 A | 3/1996 | Cooper ......................... 380/23 |
| 5,504,814 A | 4/1996 | Miyahara ....................... 380/4 |
| 5,509,070 A | 4/1996 | Schull ............................ 380/4 |
| 5,511,122 A | 4/1996 | Atkinson ...................... 380/25 |
| 5,557,796 A | 9/1996 | Fehskens et al. ............ 395/650 |
| 5,615,264 A | 3/1997 | Kazmierczak et al. ......... 380/4 |
| 5,634,012 A | 5/1997 | Stefik et al. ................. 395/239 |
| 5,646,992 A | 7/1997 | Subler et al. .................... 380/4 |
| 5,708,709 A | 1/1998 | Rose ........................... 705/59 |
| 5,809,145 A | 9/1998 | Slik et al. |
| 5,907,617 A | 5/1999 | Ronning ...................... 705/52 |
| 5,918,213 A | 6/1999 | Bernard et al. ............... 705/26 |
| 5,956,709 A | 9/1999 | Xue ................................. 7/3 |
| 5,995,625 A | 11/1999 | Sudia et al. .................... 705/51 |
| 7,010,697 B2 * | 3/2006 | Byrne et al. ................. 713/193 |

\* cited by examiner

SYSTEM FOR DYNAMICALLY ENCRYPTING INFORMATION FOR SECURE INTERNET COMMERCE AND PROVIDING EMBEDDED FULFILLMENT SOFTWARE

This application is a continuation of U.S. patent application Ser. No. 11/035,046, filed Jan. 14, 2005, now issued as U.S. Pat. No. 7,124,437, which is a continuation of U.S. patent application Ser. No. 10/126,974, filed Apr. 22, 2002 now issued as U.S. Pat. No. 7,010,697, which is a continuation of U.S. patent application Ser. No. 09/031,536, filed Feb. 27, 1998 (abandoned), which is a continuation-in-part of U.S. patent application Ser. No. 08/670,846, filed Jun. 28, 1996, now issued as U.S. Pat. No. 5,809,145, the entire subject of which are hereby incorporated herein by reference for all purposes.

FIELD OF INVENTION

The invention relates to a system for allowing information providers to prepare digital information for secure electronic commerce via the internet, including dynamic encryption of the information, and for allowing customers to browse and purchase secured, purchasable data or simply to unlock secured correspondence that is intended for some customers and not others without having to preload fulfillment software.

BACKGROUND OF THE INVENTION

Demand for network-based distribution of protected and unprotected data is increasing dramatically. Yet, many challenges exist that need to be addressed to effectively distribute data via electronic commerce such as: (1) conducting reliable, secure transactions necessary to build confidence with both information providers (e.g., data publishers) and data customers; (2) ensuring that data can be located, accessed and purchased in a timely manner; and (3) ensuring that information providers or publishers can specify access controls and that the administration of the posting of datasets which are capable of changing dynamically is not unwieldy and unmanageable.

A need exists for a data distribution infrastructure which addresses the aforementioned challenges and which overcomes a number of disadvantages associated with existing distributed data commerce systems. Traditional distributed data commerce systems are implemented behind a firewall so that secure transactions can be made. These systems, however, are characterized by high installation and maintenance costs for both software and hardware. Another disadvantage associated with many existing distributed data commerce systems is the requirement of a customer to load special fulfillment software onto the customer computer prior to the acquisition of any secure data. The fulfillment software enables the customer to order, purchase and decrypt secure data. Another disadvantage of many existing distributed data commerce systems arises from the static encryption of datasets. Information providers typically encrypt datasets to be distributed as secure datasets and store the secured datasets on a web server prior to any demand for the datasets by customers. Thus, modification of the datasets and overall administration of the posting of the datasets is less efficient since the data is already encrypted.

SUMMARY OF THE INVENTION

In accordance with an aspect of the present invention, a data distribution system is provided which transmits secured information, which is to be sold as a purchasable item or sent as secure correspondence, to a customer with an embedded executable. The embedded executable facilitates the acquisition of release codes or keys to decrypt the secured information, while obviating the need to load fulfillment software on the customer computer prior to requests for or receipt of secured information.

In accordance with another aspect of the present invention, server technology is provided to permit an information provider to dynamically encrypt information that is to be transmitted to a customer for purchase or as secure correspondence. The server technology encrypts data to be secured and which has been selected by a customer just prior to transmitting the data to the customer. In other words, encryption at the information provider's website is performed on-the-fly. Accordingly, individual pieces of content are provided in a secure commerce container.

BRIEF DESCRIPTION OF THE DRAWINGS

These and other features and advantages of the present invention will be more readily comprehended from the following detailed description when read in connection with the appended drawings, which form a part of this original disclosure, and wherein.

DETAILED DESCRIPTION OF THE PREFERRED EMBODIMENT

Figure 1:
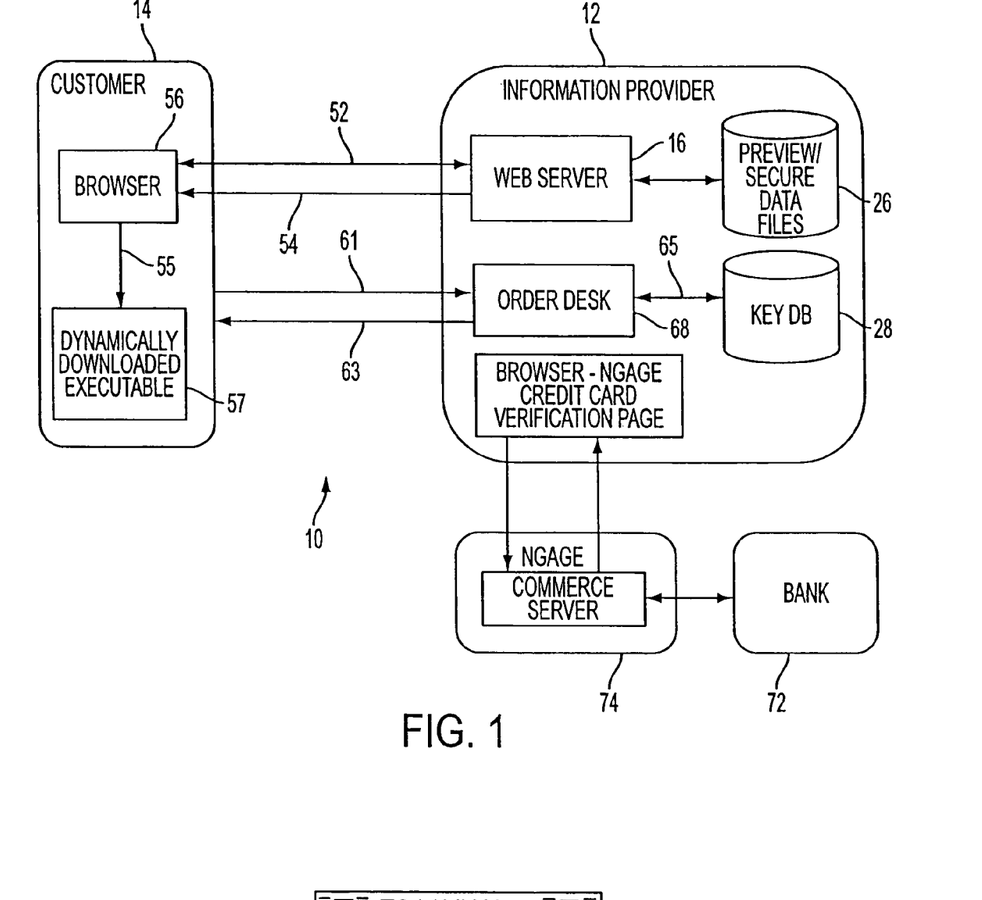
FIG. 1 is a schematic block diagram of a data distribution system illustrating the dynamic downloading of an executable with secure data files to provide customers with fulfillment software in accordance with an embodiment of the present invention.

A data distribution system (DDS) 10 is provided in accordance with the present invention to allow information providers (IPs) to prepare digital information (hereinafter referred to as "content") for commerce, as well as to perform data retrieval and transmission, and transactional services. A number of embodiments are described below which provide different electronic commerce functions. For example, a desktop encryption/decryption system (DES) is described in connection with FIGS. 1-8 which permits seamless integration of secured data commerce functionality with existing software applications and operating systems without requiring modification to a user's system. An information provider (IP) 12, as shown in FIG. 1, can use the DES to make digital content into a purchasable item, or simply to encrypt the content for a secured correspondence transmission that does not require purchasing thereof. A customer 14 can receive the secured correspondence or purchasable item via the internet or download these items from a compact disc (CD), for example. The DES provides the secured correspondence or purchasable item with an embedded executable to provide preview and purchase functions to the customer without having to modify software applications and operating system (OS) on the customer computer prior to receiving the secured content.

Figures 8, 9:
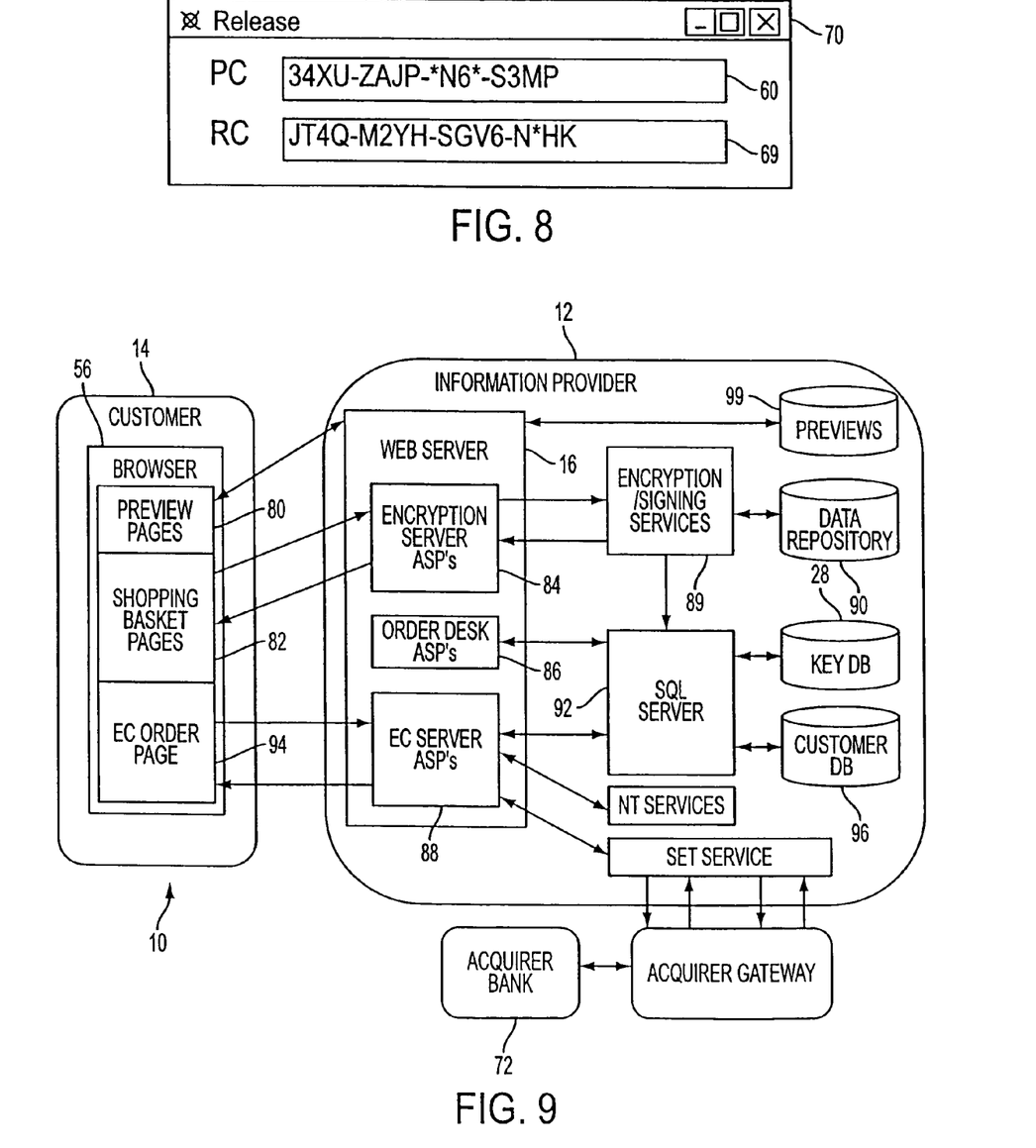
FIG. 8 depicts an exemplary computer screen generated on an information provider's computer to locate a release code corresponding to a product code for a requested purchasable item in accordance with an embodiment of the present invention.
FIG. 9 is a schematic block diagram of a data distribution system which dynamically encrypts secure content in accordance with an embodiment of the present invention.
Figure 10:
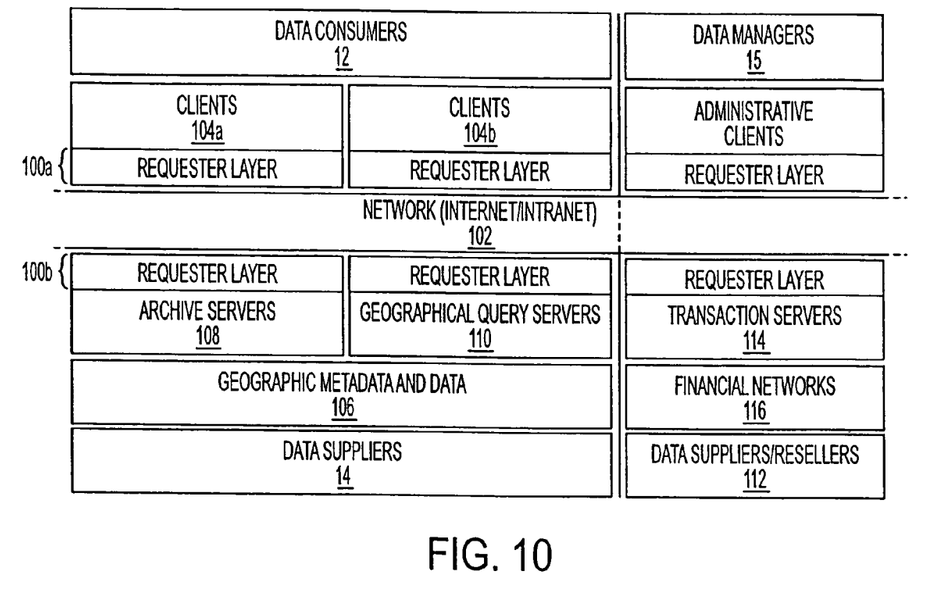
FIGS. 10, 11 and 12 are schematic block diagrams illustrating software modules including Requesters in a distributed framework for building universal data distribution infrastructures in accordance with an embodiment of the present invention.
Figure 11:
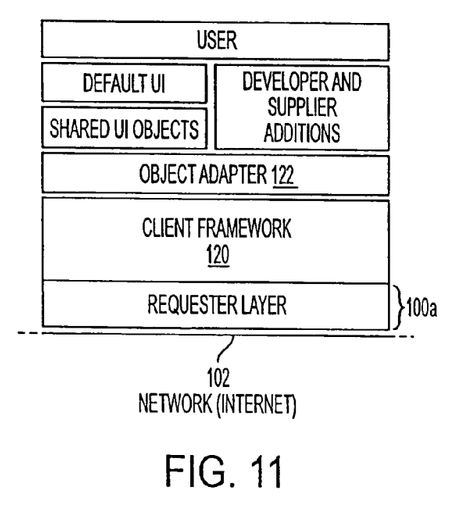
Figure 12:
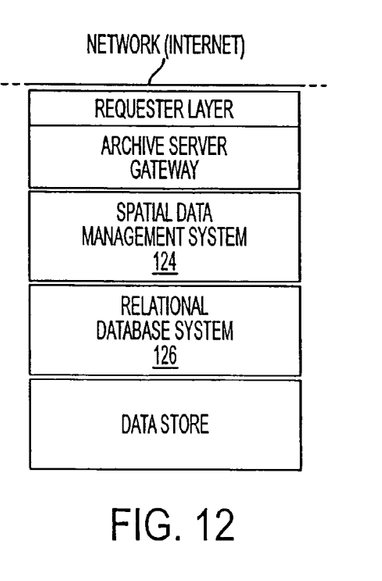

In addition, server-based technology is provided which permits dynamic encryption of content and which permits customers and IPs to otherwise engage in internet commerce (i.e., to request, preview, download and purchase selected secured content), as will be described below in connection with FIG. 9. Finally, a distributed framework is provided which can be adopted by IPs as a standardized framework from which to build a universal data distribution infrastructure, as shown in FIGS. 10-12. The distributed framework preferably employs the kernel and Requester technology that is the subject of the above-referenced application Ser. No. 08/670,846, filed Jun. 28, 1996.

Desktop Encryption/Decryption System (DES)

Figure 2:
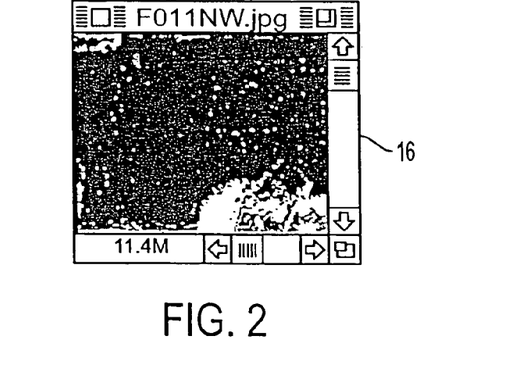
FIGS. 2 and 3 depict exemplary computer screens generated on an information provider's computer to allow an information provider to create purchasable content in accordance with an embodiment of the present invention.
Figure 3:
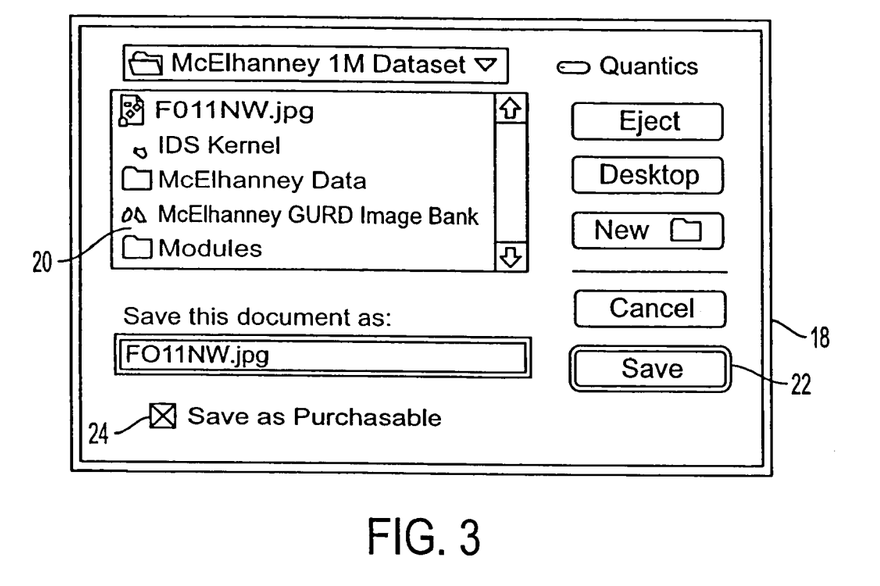

The DES provides an IP 12 with means to create secured content in the form of purchasable items or secured correspondence. The DES preferably comprises software operating on a IP computer (e.g., a Web Server 16) which generates screens 16 and 18, as depicted in FIGS. 2 and 3, respectively, when the IP is preparing content for secure commerce or transmission. The IP 12 can create content via an input device and an application program (e.g., word processing, image processing or publishing software) or retrieve existing content stored in a memory device. The newly created or retrieved files are listed in the dialogue box 20 in the "Save as Purchasable" screen 18. In accordance with the present invention, the DES software translates a user input such as selection of the "Save" button 22 into a DES function. For example, when the "Save as Purchasable" option 24 is selected by the IP 12, the "Save" call resulting from activating the "Save" button is flagged by the DES to create a purchasable item. The DES subsequently invokes special handlers in accordance with the present invention to prepare, secure (e.g., encrypt) and package the saved content for distribution via sale, or simply secure correspondence transmission with no sale.

In addition to using a secure wrapper for encryption, the DES provides the encrypted content with an embedded executable in accordance with the present invention. The executable translates application-vide and OS-wide calls such as "file open", "read", "write" and "close" into DES events such as saving selected data as a purchasable item, or providing customers with preview and purchasing dialogue, in the OS and one or more of the applications being run on the IP 12 computer or customer 14 computer. Thus, the fulfillment software required to preview, request a release code, purchase a release code and to decrypt selected content via the release code is provided to a customer computer following transmission of the selected secure content. The DES is therefore advantageous because a customer need not have previously installed fulfillment software prior to the request or receipt of the selected secure content.

With regard to an IP, the DES stores content saved as purchasable content on a hard drive 26 or other memory device as a protected file. The encryption is preferably in accordance with the encryption method described in the above-referenced application Ser. No. 08/670,846, filed Jun. 28, 1996, which generates machine-dependent release codes. Other encryption algorithms, however, can be used. The special handlers of the DES assign a product code for the protected file containing the purchasable item and create a release code or key to decrypt or unlock the protected file. With reference to FIG. 3, the IP 12 can store the release codes in a key database 28.

In the DES, a customer 14 can obtain a release code for a selected purchasable item or for secure correspondence directed to the customer via a telephone order or a facsimile modem or transaction in accordance with one embodiment of the present invention. The DES preferably provides a two layer approach to providing protected content for commerce. First, encrypted files are browsed and downloaded by the customer 14. Second, the customer 14 subsequently initiates a transaction to unlock selected ones of the encrypted file(s). Thus, the content to be protected in the present example is statically encrypted, that is, it is encrypted and stored at an IP 12 or provided on a physically distributed memory medium such as a CD even before a customer 14 has decided to unlock and, if necessary, download or purchase the content. A method of dynamically encrypting the content in accordance with another aspect of the present invention is described in connection with FIG. 9.

Figure 4:
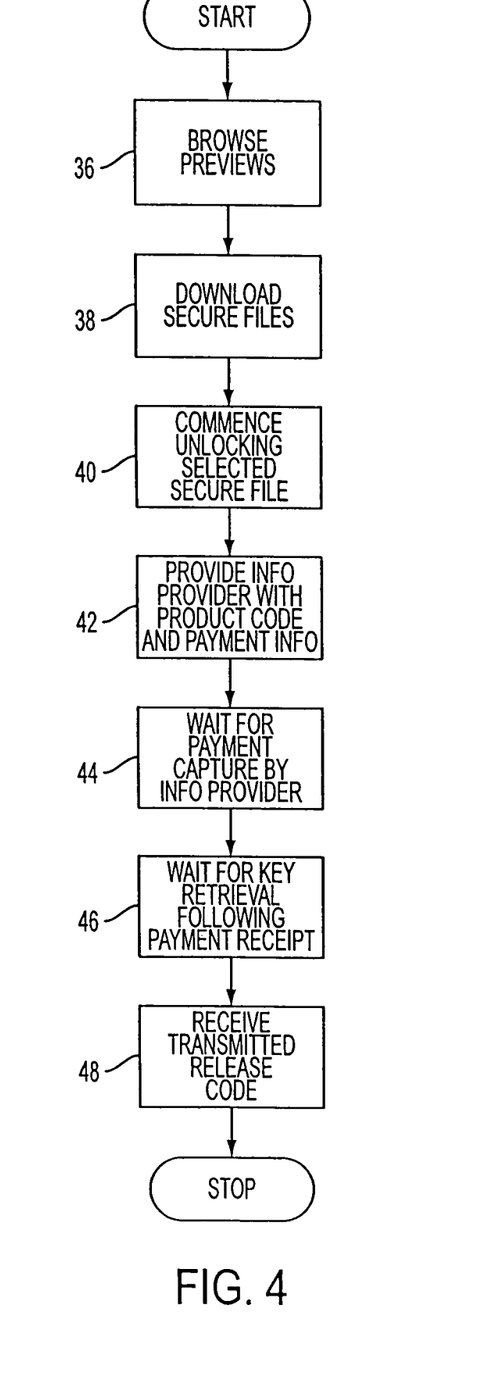
FIG. 4 is a flow chart depicting the sequence of operations for requesting a secured file with an embedded executable in accordance with an embodiment of the present invention.
Figure 5:
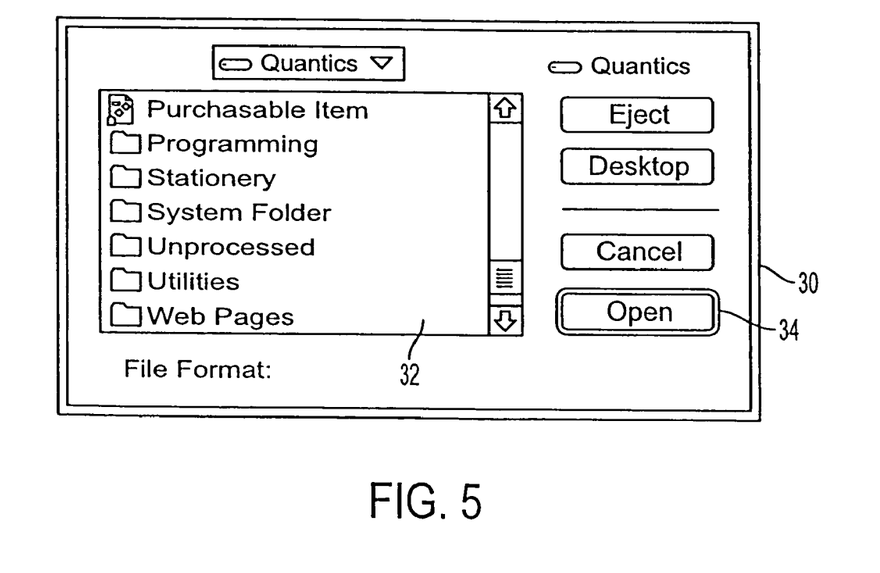
FIGS. 5, 6 and 7 are exemplary computer screens generated on a customer computer for selecting a purchasable item and purchasing a release code to decrypt the purchasable item in accordance with an embodiment of the present invention.
Figure 6:
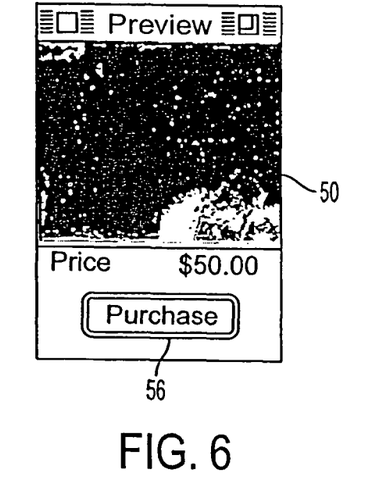

The purchase transaction supported by the DES is illustrated in FIG. 4. With reference to block 36 in FIG. 4, the customer 14 computer lists files retrievable from a CD in a CD drive connected thereto, or from a local hard drive, or from a remote website database 26 via an internet browser. The customer 14 computer generates a screen 30 (FIG. 5) which lists files that can be "opened" in a dialogue box 32 in a conventional manner using application software and/or the OS. If selected from the box 32, the embedded executable of a purchasable item preferably interprets the selection of the "open" button 34 as a request for a preview display screen 50, as shown in FIG. 6, which is optionally provided by the executable when the purchasable item is encrypted.

Figure 7:
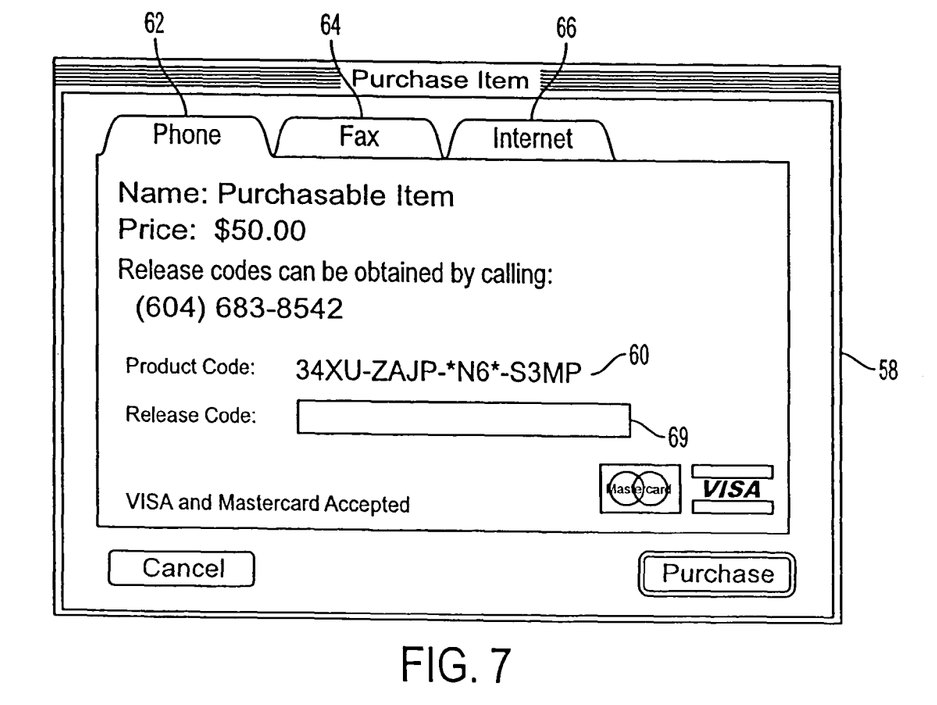

As indicated by the communication paths 52 and 54 illustrated in FIG. 1, the customer browses secure content and downloads the same into a local memory device (blocks 36 and 38 of FIG. 4). The downloaded files are each preferably provided with an embedded executable in accordance with the present invention. When a customer 14 selects the "open" button 34 (FIG. 5), or selects a "Purchase" button 56 on the "Preview" screen 50 in the currently-executing software application, and the file to be opened is identified as being purchasable, special handlers in the embedded executable annunciate user interface elements and initialize operations to be performed on the read and write functions. For example, a "Purchase Item" screen 58, as indicated in FIG. 7, is generated by the executable on the customer computer.

With continued reference to FIGS. 1 and 4, the executable provided with the downloaded secure content provides means for the customer computer to commence unlocking or decrypting the secure content in accordance with the present invention. The executable is represented by the reference numeral 57 for illustrative purposes: In accordance with the present invention, the executable 57 is not made available to the customer 14 computer until after downloading, as represented by the data path 54.

As illustrated by the data path 55 in FIG. 1 and the block 40 in FIG. 4, the executable 57 now commences decrypting of the secured content. As shown in FIG. 7, the customer 14 has the options 62, 64 and 66, respectively, of contacting the fulfillment center to purchase the selected content via a telephone transaction with an operator at a fulfillment center order desk 68 (FIG. 1), of transmitting a facsimile purchase order using a modem, or conducting an internet commerce transaction (e.g., as described below in connection with FIG. 9. The dialogue box in FIG. 7 provides a product code 60 for identifying the selected secured content to a fulfillment center, as indicated by the data path 61 in FIG. 1. The product code can be spoken to an operator at the order desk 68 during a telephone transaction, or transmitted via a facsimile modem or via the internet. The customer provides additional data such as a credit card information for payment and customer name (block 42 of FIG. 4).

With reference to blocks 44, 46 and 48 in FIG. 4, an order desk operator can enter the product code 60 on an IP computer. A release code screen 70 (FIG. 8) can be generated for display on the order desk computer to indicate the release code once a release code has been located in the key database 28 which corresponds to the product code. Upon verification of valid credit card payment with a bank 72 via a commerce server 74, the order desk computer retrieves the release code 69, as indicated at 65, and provides the release code to the customer, as indicated at 63. The customer computer can then use the release code corresponding to the product code to unlock the protected file so that the purchased content is ready for use. It is to be understood that release codes, as well as product codes, can be transmitted between the customer 14 and the IP 12 verbally via a telephone call, or by transmission via the internet or facsimile Server-Based Technology for Commerce-Enabling a Website In accordance with another aspect of the present invention, the DDS 10 uses server-based technology to implement internet commerce at an IP website. As shown in FIG. 9, a customer 14 uses an internet browser 56 to access an IP website via a Web server 16. In accordance with the present invention, the web server 16 preferably comprises a number of application-specific programs (ASPs) for implementing an encryption server 84, ASPs for controlling an order desk 86, and ASPs 88 for electronic commerce (EC) server functions. After review of secure content previews 79 using preview pages 80, the customer 14 can select purchasable items via Shopping Basket pages 82. The product codes for the requested purchasable items are provided to the encryption server 84.

The encryption server retrieves the selected purchasable items from a data repository 90 wherein the data is not necessarily encrypted in any way. The retrieved purchasable items are encrypted on-the-fly by the encryption module 88 by preferably using the machine or hardware-dependent release codes as described in the application Ser. No. 08/670, 846, filed Jun. 28, 1996. The key is then stored in the database 28 via a SQL server 92. The requested, encrypted files are then provided to the server 16 for downloading to the customer 14. After viewing the encrypted files via Shopping Basket pages, the customer can enter an EC order page 94. EC server ASPs are provided to obtain the corresponding key or release code from the key database 28 and any available customer data from a customer database 96 via the SQL server 92. The EC server ASPs 88 also perform transactional services such as a credit card transaction to pay for the requested, encrypted item. Once payment is verified, the IP Website sends the release code to the customer to unlock the desired content.

The process of generating release codes will now be described in further detail for illustrative purposes. Raw and unencrypted data in a digital format is stored in independent data files at, for example, an information provider data processing facility. The data is encrypted using a selected encryption algorithm. The key for encrypting and decrypting the data can be generated cryptographically using a random number generator, for example. The encrypted data is then stored in a database at a particular location. The encrypted data can be stored, for example, as a dataset on a CD-ROM accessed at an HTTP server or at a customer computer. A unique dataset code is assigned to the dataset and is preferably generated using a hash algorithm on the location of the dataset. The location of the dataset, the key and the hashed dataset code are then stored in a key management database maintained at the fulfillment center, and the encrypted data is distributed on the CD-ROM, for example, or made available on the network.

A user can select a dataset and initiate a request by clicking on an item in a preview screen, for example. A hardware-dependent digital signature (HDDS) can be generated in response to the dataset request. The signature can be based on a card number of a board within the customer computer or other computer-specific device. The location of the selected dataset is determined by the computer using a table on the CD-ROM or available via the network and preferably hashed. The hashed location is then concatenated with the HDDS and compressed to present the user with a product code corresponding to the selected dataset.

The product code is forwarded to the fulfillment center, where it is processed to decompress the product code, and to extract the hashed location of the selected dataset and the HDDS. The hashed location is used to find the key within the key management database for decrypting the requested dataset. The HDDS is then hashed and encrypted along with the key. The encrypted key is concatenated with the hashed dataset code, compressed, and sent as a release code to the customer.

Universal Data Distribution Infrastructure

In accordance with the present invention and with reference to FIG. 10, a system for dissemination of data is provided which combines a number of disparate system components into a reliable, secure and scalable system to meet the needs of data consumers 12 and IPs 14. The system employs industry standard technologies, systems and development requirements, which generally behave as disparate systems, and Requesters, in accordance with the present invention to facilitate the inter-operation of a disparate systems to allow them to behave as a cohesive, single entity. Requesters are described in the above-referenced parent application Ser. No. 08/670,846, filed Jun. 28, 1996. Using object-oriented kernel programming, a requester architecture is provided to operate as a high speed communication routing system which permits the transfer of data between objects within systems and applications independently of the platform, software and operating system. Thus, the Requester architecture allows for rapid integration of existing technologies into a cohesive virtual network.

As shown in FIG. 10, the Requester layers 100a and 100b provide a standard way in which to perform high-level communications, bulk delivery and resource exploration, as well as to combine existing and future technologies in a seamless manner. The Requester technology, for example, can be integrated by being built on top of such industry standards as TCP/IP and CORBA.

The Requesters in the Requester layers 100a and 100b provide three services: messaging, bulk delivery and resource exploration. For messaging, a Requester allows different pieces of software to communicate with each other and can therefore be used extensively throughout an entire system for requests, posting of results and small data transfers. Requester messaging is similar to packet delivery in a network in that messages are routed from one object to others on the same computer or across the internet 102. Bulk delivery operations via Requesters are implemented on top of a messaging architecture to provide managed flows of data based on a connection-oriented mechanism. Requester bulk delivery is efficient because it allows dynamic link profiling, which uses minimum bandwidth while maximizing throughput, automatic bit width selection, failure recovery, compression and advanced flow control. Thus, downloading of large amounts of data is efficient and reliable for the user and easier for an IP since the data can be dumped into a stream or named pipe. Requester resource exploration enables the system to transform a collection of distinct elements into a single entity. Resource exploration permits software to explore what is available using lists, indices and directories, which are automatically generated and updated. Thus, Requester resource exploration significantly reduces maintenance, as well as facilitates the integration of advanced software agents that can dynamically probe large amounts of data in search of specific data entities.

In the exemplary system illustrated in FIG. 10, a framework is provided for distributing geographic data. It is to be understood that the framework can be used to distribute any type of data. The Requester layers 100a and 100b facilitate communication between data consumers 12, IPs 14 and data managers 15 via an internet or intranet 102. Individual consumers 12 and groups of consumers 104a and 104b can access data such as geographic metadata and other data 106 via servers such as an archive server 108 or geographical query server 110.

The relationships with consumers 12 is becoming more prevalent since profiles can be built on consumer data preferences as a consumer browses and accesses data. Profiles are an effective means for target marketing through advertisements and special offers. Preferred types of data, purchasing patterns and other information allow companies to identify who their customers are and therefore to more effectively sell their data or create relationships with re-sellers 112 to sell their data. Relationships between sellers and re-sellers for value-added data products based on many suppliers' data, percentages or fixed sums of transactions can be automatically routed by the framework illustrated in FIG. 10 to the correct parties, thereby facilitating supplier/re-seller relationships. The requester layer 100b, for example, facilitates the routing of financial and other data between transaction servers 114 and financial networks 116.

With reference to FIG. 11, client framework 120 can be implemented which standardizes ways in which users communicate with servers over the internet 102. Clients communicating through the Requester layer 110a to the different standards supported by the framework of the present invention can communicate with all vendor's servers without requiring specialized interface levels to obtain base functionality. Users can therefore point their internet browser to a data supplier's site which automatically loads a Java client link which links the user to the system. A client framework can also be developed to adapt new functionalities implemented on top of the client framework 120. Thus, developers can enhance the client framework to add specialized features and capabilities, to use alternate means of navigation and to embed new technologies. By allowing functions such as a pane to display a web page, data suppliers do not have to learn a completely new way of publishing content since they can place their web site as a metadata value on their archive server 108. For example, by exposing capabilities through an object adapter 122, an embedded Java applet or an ActiveX component can interact with the client to perform functions together to provide a unified user experience.

With reference to FIG. 12, server specifications define how servers communicate with each other and with clients through the Requester layers 100a and 100b. For example, specifications define how archive servers 108 advertise their presence, how data is labeled, as well as defining metadata requirements, data and metadata access methods, security options, access log formats, object announcement for resource exploration, and persistent wrapping for security in Requester interfaces. Archive server 108 specifications provide guidelines for storing data to be distributed, such as geographic data and metadata. In accordance with the present invention, an archive server specification is provided which sets forth basic functionality, required commands in the manner in which an archive server interacts with the Requester layer 100 and therefore provides information required for a vendor to develop a full-feature archive server based on existing server technologies. In the case of geographic data, many different geospatial data types exist. Specialized archive servers can be created to manage different data types. For example, a spatial data management system 124 such as ESRI SDE can be developed for vector data which runs on top of a database environment 126 to provide full capability vector data support. Raster data has different requirements than vector data and requires a different approach. An archive server 108 can be implemented which supports such capabilities as arbitrary area extraction to better manage raster data.

Specifications are also provided for a query server 110 to provide guidelines for query systems for searching of data to be distributed. Query server specifications define basic functionality and commands that must be implemented, how the query server interacts with the requester layer 100, and advanced capabilities, such as automated index generation and resource detection. The specification can be used to create a layer on top of a current search engine to allow the search engine to become a seamless part of a cohesive system. Specifications for query servers can include how query servers advertise their presence, how indexed data can be accessed and discovered automatically, and can provide guidelines for searching data, as well as query initiated methods, list formats and requester interfaces.

Similarly, transaction server 114 specifications provide access control systems guidelines by defining basic functionality and commands that must be implemented, as well as defining how a transaction server interacts with a requester layer. Existing transaction servers are easily provided to a system with the addition of a layer such that interfaces with financial networks can be provided by financial transaction servers which is a subset of a transaction server specification. The system illustrated in FIG. 10 preferably uses the SET protocol developed by Visa and MasterCard. Transaction server specifications define how transaction servers advertise their presence, how transaction servers securely retrieve access control information from an archive server and how transaction servers invoke the wrapping of a piece of data and invoke requester interfaces.

While certain advantageous embodiments have been chosen to illustrate the invention, it will be understood by those skilled in the art that various changes and modifications can be made therein without departing from the scope of the invention as defined in the appended claims.

What is claimed is:

1. A method of delivering encrypted content to a user computer via a communication network comprising the steps of:
   generating a query using said user computer to search for content via said communication network, said content being available from an information provider via a server and said communication network;
   receiving a dataset comprising at least one item available for acquisition and provided via said server in response to said query;
   selecting at least one item provided in said dataset;
   generating a machine-dependent product code at said user computer, said product code comprising a unique identifier corresponding to at least a part of said user computer to uniquely identify said user computer;
   transmitting a request for said at least one item and said product code to said information provider; and
   encrypting said at least one item in response to said request.

2. A method as claimed in claim 1, wherein said information provider encrypts said at least one item in said dataset using a key and generates a release code for said at least one item using said product code and said key in response to said request, said release code being machine-dependent with respect to said user computer.

3. A method as claimed in claim 2, further comprising the steps of:
   receiving said release code at said user computer; and
   decrypting said at least one item at said user computer using said release code.

4. A method as claimed in claim 1, wherein said unique identifier is derived from a hardware device in said computer.

5. A method as claimed in claim 1, wherein said unique identifier is derived from a card number of a circuit board in said user computer.

6. A method of delivering encrypted content to a user computer via a communication network comprising the steps of:
   reviewing a dataset using said user computer, said dataset being provided to said user computer by an information provider via a communication network;
   selecting at least one item available for acquisition and provided in said dataset;
   generating a machine-dependent product code at said user computer, said product code comprising a unique identifier corresponding to at least a part of said user computer to uniquely identify said user computer; and
   transmitting a request for said at least one item and said product code to said information provider; and
   encrypting said at least one item in response to said request.

7. A method as claimed in claim 6, wherein said dataset comprises secure content previews of selected content items from a data repository in said communication network, said content items being stored unencrypted at said data repository, said at least one item corresponding to one of said selected content items, said reviewing step comprising the step of reviewing said secure content previews prior to encryption of said at least one item in response to said request.

8. A method as claimed in claim 6, wherein said information provider encrypts said at least one item in said dataset using a key and generates a release code for said item using said product code and said key in response to said request, said release code being machine-dependent with respect to said user computer.

9. A method as claimed in claim 8, further comprising the steps of:
   receiving said release code at said user computer; and
   decrypting said item at said user computer using said release code.

10. A method as claimed in claim 6, wherein said unique identifier is derived from a hardware device in said user computer.

11. A method as claimed in claim 6, wherein said unique identifier is derived from a card number of a circuit board in said user computer.

12. A method of delivering a set of data items from a server database to a client computer via a digital medium comprising the steps of:
   searching for data items in said server database via said client computer;
   selecting desired data items via said client computer and sending the selection results to said server;
   packaging the selected data items via said server into a single compound file, encrypting it with a package key, and storing the key in a key database along with a unique package identifier;
   attaching executable client fulfillment software to the package file via said server;
   receiving the package of encrypted data items at said client computer from said server and executing the client fulfillment software;
   generating a product code via said client fulfillment software that comprises said unique package identifier and transmitting said product code to said server;
   after receiving said product code, generating a release code at said server that comprises said package key and transmitting said release code to said client computer;
   receiving said release code and decrypting the data items via said client fulfillment software for storage on said client computer.

* * * * *